United States Patent [19]

Columberg

[11] 4,299,937

[45] * Nov. 10, 1981

[54] PROCESS FOR THE POLYMERIZATION OF PROPYLENE

[75] Inventor: Alfred Columberg, Geneva, Switzerland

[73] Assignee: Battelle Memorial Institute, Carouge-Geneva, Switzerland

[*] Notice: The portion of the term of this patent subsequent to Mar. 4, 1997, has been disclaimed.

[21] Appl. No.: 77,330

[22] Filed: Sep. 20, 1979

Related U.S. Application Data

[63] Continuation of Ser. No. 796,234, May 12, 1977, Pat. No. 4,191,816.

[30] Foreign Application Priority Data

May 14, 1976 [CH] Switzerland .................. 6057/76

[51] Int. Cl.$^3$ ..................... C08F 4/02; C08F 10/06
[52] U.S. Cl. ................. 526/124; 526/142; 526/155; 526/156
[58] Field of Search .............. 526/124, 155, 156, 142

[56] References Cited

U.S. PATENT DOCUMENTS

| | | | |
|---|---|---|---|
| 3,676,415 | 7/1972 | Diedrich et al. | 526/124 |
| 3,883,492 | 5/1975 | Delloville et al. | 526/124 |
| 3,989,879 | 11/1976 | Berger et al. | 526/124 |
| 4,056,668 | 11/1977 | Berger et al. | 526/124 |
| 4,098,979 | 7/1978 | Maemoto et al. | 526/141 |
| 4,191,816 | 3/1980 | Columberg | 526/124 |

FOREIGN PATENT DOCUMENTS

601919 7/1960 Canada ........................ 526/904

*Primary Examiner*—Edward J. Smith
*Attorney, Agent, or Firm*—Finnegan, Henderson, Farabow, Garrett & Dunner

[57] ABSTRACT

A process for the preparation of catalysts of the polymerization of olefines, e.g. ethylene and propylene. This process comprises essentially the two following steps:

(1) A compound (A) of an element selected from groups Ia, Ib, IIa, IIb, IIIa, IIIb, VIa and VIIb of the Periodic Table of Elements is heated and milled under the protection of an inert gas with an organic acetoxy compound; then the volatile portions of the mixture are eliminated by distillation.

(2) The solid resulting from the first step is dissolved or dispersed in a non-polar hydrocarbon and an activator (B) is added, mixed and heated with said solution or dispersion until a homogeneous solution or dispersion of activated catalyst is obtained. (B) is selected from compounds of elements IVa, IVb and Vb of the Periodic Table. This catalyst is used in admixture with a polymerization promoter (C) selected from organo-metallic additives, e.g. aluminum-organic compounds for the polymerization of olefines at relatively low temperatures and pressures. Polymerization activities which may reach about 500,000 have been measured.

4 Claims, No Drawings

PROCESS FOR THE POLYMERIZATION OF PROPYLENE

This is a continuation of application Ser. No. 796,234, filed May 12, 1977, now U.S. Pat. No. 4,191,816.

The present invention concerns a process for the preparation of olefine polymerization catalysts, catalysts resulting from this process and a process for the polymerization of olefins using these catalysts.

It is possible, by using these catalysts to obtain polyolefines, namely polyethylene and polypropylene from ethylene and propylene respectively at relatively low pressure, e.g. a few atmospheres, without or with little other gases as dilutants or carriers. The polymers obtained according to the present polymerization process are generally highly crystalline and of high industrial quality.

Until now, the polymerization of olefines under low pressure has been carried out by means of catalysts consisting of rather complex and heterogeneous mixtures. Thus, "Ziegler catalysts" are being used which form an important class of such catalysts and generally comprise a metal-organic compound (the "co-catalyst" or "promoter" that will be defined as "(C)" hereunder) derived from elements Ia, IIa, IIIa or IVa of the Periodic Table and a transition-metal compound (the so-called "catalyst" that will be defined as "(B)" hereafter) derived from elements IVb, Vb or VIb of the Periodic Table. Among "(C)" compounds, one can often find aluminum and boron derivatives, such as $Et_3Al$, $Et_2AlCl$ and $EtAlCl_2$ (Et meaning ethyl). Among compounds falling under the "(B)" definition, one can recite derivatives of titanium and vanadium such as $TiCl_4$, $VCl_4$, $VOCl_3$, $Ti(OBu)_4$ (Bu meaning butyl). Examples of "Ziegler" catalysts are found, for instance in the following patents: Belgian Nos. 533.762, 534.792 and 534.888; German Nos. 973.626, 1.004.810; French No. 1.235.303; U.S. 3.903.017.

The Periodic Table referred to in the present specification is the Periodical Classification Table according to Mendeleev as it appears for instance in "Handbook of Chemistry & Physics", the Chemical Rubber Company, Cleveland, Ohio, U.S.A.

There exists also many other catalysts for the polymerization of olefins which more or less resemble the "Ziegler" catalysts as they all comprise using (C) type co-catalyst compounds. For instance, French patent No. 2.160.850 (SNAM PROGETTI) discloses a process for polymerizing olefines by means of a catalyst comprising aluminum compounds as (C) type compounds and, as (B) type compounds, halogenated organometallic compounds of elements taken from groups IIb, IIIa, IVa, IVb, Vb and VIb, namely $MeSiCl_3$, $Et_3SnCl$, $HSiCl_3$ and the like (Me being methyl). Polymers having high molecular weights (several hundred thousands) are reported being available using such catalysts but values for "polymerization activities" (the meaning of which will be described later) are not given.

French patent No. 1.223.008 (UNION CARBIDE) describes the use, as catalysts for the polymerization of olefines, of mixtures of trialkyl aluminum compounds (C) and vanadyl carboxylate salts (B) e.g. $OV(OAc)_2$ (Ac meaning acetyl). Polymerization activities ranging from about 20 to 200 can be computed from the data given in the Examples.

French patent No. 1.155.944 (PHILLIPS PETROLEUM) discloses a process for producing polyolefins of medium molecular weights (e.g. of the order of 20,000 to 50,000) by the use of catalysts constituted by carboxylic salts or metal-organic derivatives of elements of group IVb of the Periodic Table (compounds (B)) and as compounds (C) either a metal-organic halide derivative from Al, Ga, In or Be, or a mixture of a group Ia, IIa, IIIa metal in powder form with an alkyl halide. Polymerization activities are not given but from the data given in the Examples, they do not appear to exceed about 100.

U.S. Pat. No. 3,764,591 (TOHO TITANIUM) discloses a process for the polymerization of propylene wherein the catalyst comprises a mixture of usual aluminum-organic compounds (C) with a (B) material consisting of a titanium halide having a valency less than 4 and having been milled beforehand with an organic ester in the presence of oxygen. Activities of the order of 250 are being reported.

Other processes of the prior art make use of so-called "supported catalysts" wherein a third element (material (A)), inert or active, is added in admixture with elements (B) and (C). Thus, French patent No. 1,427,204 discloses catalysts for the polymerization of olefines comprising benzoquinhydrone and other related quinhydrones as element (A) associated to (B) compounds selected from Cr, Mo, Vi, Ti and Zr derivatives and to usual aluminum-alkyl (C) compounds. High activity values (of the order of 2,000–20,000 can be computed from the Examples).

Most processes and catalysts of the prior art have the drawback that, for being used industrially, they require a relatively large amount of the catalytically active material relative to the weight of polyolefine formed. Further, the catalysts are rarely homogeneous materials and they do not properly distribute within the polymerization medium. Thus, the end product may suffer from the presence of unwanted colorations or particles of undispersed mineral agglomerates. Therefore, subsequent purification of the polymers may become necessary which is an expensive and undesirable operation.

The process of the present invention largely obviates such drawbacks as it furnishes catalysts of light color and very high activity for the polymerization of olefines; therefore, it can be used in very low quantities. Further, it disperses readily and completely within the polymerization media.

Thus, it has been recently shown in a co-pending application (published now in Germany under No. 26 27 770 but the publication of which is dated later than the priority date of the present application) that, against all expectations, catalysts for the polymerization of olefines could be made containing no transition element compounds of type (B) in accordance with an entirely new process. These catalysts, mainly based on (A) "support" type compounds, e.g. salts of metals of groups I, II and III of the Periodic Table having been "modified" by such new process which, briefly described, consists in the heating and milling thereof with some organic compounds, are very homogeneous materials, mostly soluble in inert solvents and nearly colorless which, combined with usual (C) elements, are effective for catalyzing the polymerization of olefines. However, their activity is not always considered sufficient and it was desirable to increase such activity without sacrificing the other mentioned qualities.

This has been now achieved by an "activation" of (A) elements of the kind described in DOS 26 27 770 by means of traces of transition elements.

Consequently, the process of the present invention comprises the following steps:

(1) heating with mixing and milling under the exclusion of air and moisture at least one solid supporting compound of an element selected from groups Ia, Ib, IIa, IIb, IIIa, IIIb, VIa and VIIb of the Periodic Table with at least one organic acetoxy compound, then eliminating by heating under reduced pressure the volatile components of the solid product thus obtained which will then dissolve or be homogeneously dispersed completely or nearly so in inert, non polar solvents, then (2) forming such a homogeneous solution or dispersion in a hydrocarbon solvent and adding therein under mixing at least one compound of an element selected from groups IVa, IVb and Vb of the Periodic Table and heating for obtaining a homogeneous solution or dispersion of the activated catalyst.

Thus, the above process consists in subjecting a "supporting" compound (A) to a modification (step (1)) and then activating the modified (A) compound in solution by adding thereto (step (2)) an activating transition element compound (B), thus obtaining a catalyst which can be defined as (AB). Thereafter, polymerizations are carried out with (AB) solution in admixture with usual (C) "promoter" or "co-catalyst", e.g. an aluminum organic compound.

As compounds (A), one can use for instance salts of alkali-metals, e.g. Li, Na, K; earth-alkali metals, e.g. Be, Mg, Ca, Ba; aluminum, indium, thallium; of metals such as copper, zinc, cadmium and lauthanum; and of higher valency metals such as selenium and manganese. The preferred elements are magnesium, aluminum, copper and manganese.

The salt type under which such metals can be used in the process of preparing the catalysts has not been definitely ascertained. This is so because one does not really understand what are the factors which are responsible for "modifying" during step (1) the inert "support" compounds (A) into compounds having already a marked polymerization catalytic activity. One has however noted that, during step (1), the compounds (A) were undergoing a color change (e.g. from white, they become yellowish) and that, although they were originally insoluble in non polar organic solvents, they become soluble or at least highly dispersible in such solvents.

Thus, the salt types, or in other words the acids of which the anion is combined with the metal in such salts (A) are preferably selected from their properties of volatility during step (1) or compatibility with the modified (A) compound. More explicitely, this means that the acid, of which the anion is combined with compound (A), must preferably either be expelled with the volatiles during step (1) or it should not act as an inhibitor of the activity of the terminated catalyst. For instance, it has been noted that although chlorine acts as an inhibitor in this respect, chlorides can still be used as starting (A) salts because HCl is expelled totally or nearly so during step (1). In contrast, sulfates, phosphates and other salts derived from non volatile acids are disliked as (A) materials, whereas salts or complexes with organic acids or complexants are preferred because such acids or complexants are either volatile or they do not inhibit the activity of the terminated catalyst. Thus, derivatives such as acetates, formates, propionates, acetylacetonates, benzoates and most organic salts or complexes of the above metals can be used favorably. In fact, until now no compound falling in such last category of organic acid salts has been found to be harmful in the present process.

It must be remarked at this stage that the fact of using, in the preparation of an olefine polymerization catalyst, salts of alkali or earth-alkali metals is not new. For instance, there is disclosed in French patent No. 1,529,845 (SOLVAY) a catalyst formed from MgO or HOMgCl activated with $TiCl_4$ or $VOCl_3$ which, in admixture with usual $AlR_3$ metal-organic promoters, can be used to polymerize olefines with activities of up to 40,000 approximately. French patent No. 2,225,247 (STANDARD-OIL) discloses a very similar catalyst but with the difference that the (A) compounds are magnesium acetates or chloroacetates.

Further, in French patent No. 1,425,247 (HOECHST), there is disclosed the use of a catalyst for polymerizing olefines consisting of a mixture of $TiCl_4$ with a haloalkylaluminum compound and alkali or earth-alkali carboxylates. However, polymerization activities obtained by computation of the data in the Examples do not appear to exceed about 500.

However, although the above prior art may bear some superficial resemblance to the present invention, it lacks the carrying-out of step (1) which is an essential feature of the present invention.

As organic acetoxy compound to be used in step (1) of the present invention, one can use carboxylic acid and/or anhydrides of formulae R-COOH and $(RCO)_2O$ wherein R is H, Me, Et, Prop or iso-Prop (Prop meaning propyl). R can be substituted by halogens (e.g. chloroacetic acid can be used) but halogenated acids are not preferred acetoxy compounds as the activity of the final catalyst obtained therewith is generally inferior to that of catalyst prepared by processes involving unsubstituted R compounds. The exact limitations of R, chemically, have not been ascertained.

It should be remarked that the acetoxy compound may comprise acids, anhydrides or mixtures thereof. In general, the ratio of the components in such mixtures is not critical. However, in some cases one prefers to use only the acid without anhydride, for instance if compound (A) is anhydrous and derived from a volatile acid. Thus, in the case of say, $MgCl_2$, the reaction during step (1) with say, acetic acid, leads to magnesium acetate whereas HCl is expelled by heat from the product. It can be mentioned also that anhydrides can be used advantageously in the proportion necessary to react with and destroy some crystallization or other water which might be present with compound (A) at the start of step (1). Thus, it is essential that all moisture be absent from the modified product (A) at the end of step (1).

The proportion of acetoxy compounds and compounds (A) in step (1) are not critical. However, care should be taken that the amount of acetoxy compound should be enough for obtaining a mixture which is sufficiently fluid to undergo proper mixing and milling when step (1) is carried out. Thus, one preferably uses about 25 to 100 ml of acetoxy compound for about 10 mmoles of (A).

Preferably, step (1) is carried out for 10–30 hours, between 70° and 100° C. A shorter period is not effective and longer periods are useless or harmful. The temperature interval is rather critical: at lower temperatures the "modification" reaction is too slow; higher temperatures, e.g. reflux temperatures, are markedly detrimental, the catalysts losing, in such cases, part of their activity. The reasons why this is so are unknown.

The reaction is preferably carried out in a rotating apparatus using, as a milling aid, balls of hard materials such as ceramic or the like. The preferred apparatus is a rotatable evaporator called "Rotavapor" manufactured by the Büchi Company, Flawil—Switzerland. This consists of a slant rotating flask equipped with a condenser, a vacuum intake and a gas inlet tube. This kind of apparatus is found in nearly all organic chemistry laboratories. Therefore, during step (1) the material is continuously dispersed and finely milled by rotation and mixed with the organic liquid while being protected from the outside atmosphere by an inert dry gas stream.

It is interesting to note at this stage that there exists a process (see U.S. Pat. No. 3,840,470) whereby a magnesium formate or acetate is heated in a dry condition in an oven at high temperature and thereafter activated with $TiCl_4$ to form, together with (C) compounds, an olefine polymerization catalyst. Computed activities are, in this case, of the order of 4,000 to 5,000 which is, however, generally much less than the activities obtained from the present catalysts as will be seen hereinafter.

Regarding now step (2) of the present process, one prefers to use, as activating compounds (B), derivatives of elements of groups IVa, IVb and Vb such as $TiCl_4$, $GeCl_4$, $TiCl_3$, $VCl_4$, $VOCl_3$, $SiCl_4$, $Ti(OBu)_4$. Liquid activators are preferred for evident reasons of mixing efficiency. Other convenient activators are listed in French patent No. 1,155,944, page 3, col. 1. The best results have been obtained, so far, with $TiCl_4$ and $TiCl_4$ for propylene polymerization.

The quantities of the activating compounds (B) relative to the modified supporting compounds (A) may range, in mole ratio, from 1:10 to about 5:1; usually ratios of 1:1 or 2:1 are preferred. It must be pointed out that, generally, only part of the activating (B) compound will get affixed on to the modified (A) compound in the final catalyst.

Preferably, the activating step (2) is carried out between 70° and 90° C. for a period ranging from 1 to 30 hours in a non polar solvent in which the product resulting from step (1) is soluble or homogeneously dispersible. Such solvents include, for instance, hexane, cyclohexane, petroleum ethers, benzene and other liquid hydrocarbons. Benzene is preferred. The amount of solvent per weight of modified (A) compound is not at all critical. Generally, 100–200 ml for 10 mmoles of (A) is suitable.

It may happen that, when dispersing or dissolving the product from step (1) in such non polar solvent, a small amount of an insoluble residue remains in the flask wherein step (1) has been carried out. This is not harmful as the supernatant liquid is simply decanted in another flask before subjecting it to the step (2) treatment. In such case, the residue may be combined with another step (1) run or discarded.

Step (2) reaction may advantageously be carried out in the same apparatus as used for step (1). The temperature and time ranges given above for step (2) are not critical although, naturally, the temperature should not be kept too low or the time too short if effective activation must be ensured.

As pointed out hereinbefore, the mechanisms involved in the process of the invention and the reasons why catalysts of high polymerization activity are obtained by the present process are still unknown. One reason, however, is probably the highly dispersible or soluble state of the catalyst in non polar solvent achieved under step (1) of the process. A factor of this kind has been mentioned for instance in Swiss patent 467,635 (SOLVAY).

On the other hand, although the catalysts resulting from the present process contain only small amounts of transition elements, or no transition element at all, for instance in the case when the activator is a tin or Germanium derivative, the polymerization activity thereof is higher than that of classical Ziegler catalysts.

This activity is expressed quantitatively by the following ratio:

$$W_p/(T \times W)$$

where $W_p$ is the weight (in gram) of solid polymer obtained from a polymerization experiment carried with W grams of catalyst during T hours. Clearly, however, W can represent the total weight of the catalyst obtained from the present process or $W_A$ the weight of the metal of moiety (A) or $W_B$ the weight of the metal of moiety (B). In the present case, only $W_B$ is considered as this permits a direct comparison with usual Ziegler catalysts.

Thus, in the present process which, in summary, consists in the succession of step (1), that is the "modification" of compounds derived from groups Ia, Ib, IIa, IIb, IIIa, IIIb, VIa and VIIb (element (A)) and step (2), that is the "activation" of compounds (A) by means of compounds derived from groups IVa, IVb or IVc (element (B)), the material acquires an activity for polymerizing olefines in combination with a metal-organic compound from groups Ia, IIa, IIIa or IVa (element (C)) which is much higher than the activity of the transition element catalysts belonging to the class of Ziegler catalysts.

This result is unexpected since, as mentioned previously, the Ziegler catalysts always include a large proportion of transition element compounds and since the omission of such compounds results normally in the vanishing of the catalytic activity.

The use of the catalysts resulting from the present process for polymerizing or co-polymerizing olefines, e.g. ethylene or propylene, comprises adding to a non polar organic solvent a portion of the solution or dispersion of the activated catalyst (AB) as described above, adding at least one metal-organic compound (C) of an element of groups Ia, IIa, IIb, IIIa or IVa of the Periodic Table and introducing into this solution the olefine at a rate, pressure and temperature and for a time sufficient to produce the polymerized olefine.

As compound (C), one preferably uses an aluminum-organic compound of formula $Al_nR_yX_{(3n-y)}$ wherein R is an alkyl group, X is halogen, n is 1 or 2, y is an integer not exceeding 3 when n=1 and equal to 1, 3 or 5 when n=2.

Preferably, one uses $Et_2AlCl$. The preferred polymerization conditions are: temperature 20°–70° C.; pressure 2–50 atmospheres; time 0,25–10 hours; no carrier gas. However, these conditions are not critical and can be varied below or beyond the given values, if deemed necessary.

The following Examples describing specific embodiments of the invention, catalyst preparation and polymerization experiments illustrate the invention in more detailed fashion.

EXAMPLE 1

Step (1)

10 mmoles (1,6 g) of magnesium diacetate monohydrate (Mg(OAc)$_2$.H$_2$O) of analytical quality and containing no transition element impurities were placed in a rigorously dried 500 ml flask together with 35 ml of AcOH and 35 ml of Ac$_2$O. Two milling balls 50 g each were added, the flask was connected to a rotavapor apparatus, flushed twice with dry N$_2$ and the content was heated under milling and mixing conditions (60 rpm) for 20 hours at 80° C. under a protection of dry N$_2$. The product which was originally colorless, slowly turned yellowish during the heating period.

The content of the flask was subjected to progressively reduced pressure (down to 1 Torr) and thereafter heated to 90° C. for 80 hours whereby all volatiles were eliminated. During this heating period the flask was connected to the supply of N$_2$ and contacted with a container with P$_2$O$_5$ which did not appreciably change during the operation.

Step (2)

100 ml of dry pure benzene were added to the content of the flask whereby most of the solid dissolved or got finely dispersed within the organic solvent as a slightly milky yellowish homogeneous solution. This solution was decanted to another dry flask wherein 3 ml of TiCl$_4$ freshly distilled under N$_2$ were added dropwise under magnetic stirring and under dry nitrogen. The mixture was thereafter heated for 6 hours at 80° in the rotavapor apparatus.

Then, the solvent and excess TiCl$_4$ were eliminated by distillation under reduced pressure which gave a white-yellow solid which was taken back in 100 ml of benzene. The latter was again eliminated as above and the residual solid was heated at 100° C. for 48 hours under 1 Torr.

200 ml of benzene were added to the solid which dissolved partly giving a diluted milky solution containing, from analysis, 3.9 mg/l of Mg and 19.5 mg/l of Ti. This solution constituted a sample of catalyst (AB) prepared in accordance with the invention.

Two control solutions were prepared as follows:

A. The first solution was prepared as described above under Step (1) but Step (2) was omitted. The resulting modified magnesium acetate solution in benzene contained, from analysis, 60.7 mg of Mg/l.

B. 10 mmoles of magnesium acetate of the same kind used under Step (1) above were heated 20 hours at 160° C. under 0,05 Torr after which they were taken in 100 ml Bz and treated with 5 ml of pure TiCl$_4$ as described under Step (2) above. After washing twice with dry benzene, the residue was dried for 6 hours at 130° under 2 Torr and finally taken back in 100 ml of benzene which resulted in a poorly dispersible suspension containing 42 mg/l of Ti and 55 mg/l of Mg as ascertained by analysis.

Polymerization

Polymerization experiments were carried out in a 1 liter glass reactor, previously dried at 90° C. under 1 Torr for 20 hours, equipped with a stirrer and a gas inlet and outlet. The polymerization solvent was dry benzene (300 ml).

After having introduced the solvent at room temperature, the reactor was flushed with dry nitrogen under normal pressure after which ethylene was introduced (4 atm.) which partly dissolved in the benzene under stirring.

Then 5 ml of catalyst solution (AB), corresponding to 0.1 mg of Ti (0.002 mmole) were introduced under stirring into the reactor together with 8 mmoles (1.237 ml) of diethylaluminum chloride.

Thereafter, the ethylene pressure was raised to 10 atm. and polymerization started at 20° C. as shown by the formation of a colorless product. The polymerization was continued for 1 hour, after which the ethylene supply was cut off, the reactor was opened and the mixture was filtered to separate the white solid which had formed. 66 g of polyethylene having 70% crystallinity was collected from which a catalytical activity of 660,000 was calculated. The product was colorless and of very high quality.

When the above polymerization experiment was repeated with control solutions A and B, activities of 880 and 16,600 respectively were measured. This last figure could have been expected from a very good classical Ziegler catalyst.

Comparison of the activity values for catalyst (AB) and A or B clearly demonstrates the tremendous improvements brought up by the present invention.

As a last control, a polymerization experiment was also carried out with pure magnesium acetate carefully dried for 24 hours at 95° C. under 1 Torr. In such control experiment, no solid polyethylene was obtained.

When the present catalyst (AB) was used for polymerizing propylene using 300 ml Bz, a quantity of (AB) corresponding to 19.5 mg Ti, 15 mmoles of (C) and operating at 70°-80° for 10 hrs. at 10 atm., a polymerization activity of 268 was obtained.

EXAMPLE 2

A catalyst (AB) was prepared as described in Example 1 using 10 mmoles (3.78 g) of pure aluminum acetate (Al$_2$O(AcO)$_4$.4H$_2$O), 50 ml of AcOH, 50 ml Ac$_2$O, heating 20 hours at 80° C., drying 120 hours at 90° C. under 1 Torr then activating with 2 ml of TiCl$_4$ in 200 ml Bz, heating 72 hours at 100° C. under 1 Torr until all residual chlorine is expelled and finally dispersing in 200 ml of benzene. Such solution analyzed for 718 mg Al/l and 787 mg Ti/l and gave a catalytic activity of 36,500 for the polymerization of ethylene at 20°-40° under 10 atm.

EXAMPLE 3

The catalyst solution described at Example 2 was used for the polymerization of propylene under the following conditions: Benzene 200 ml; Ti 120 mg (2.5 mmoles, 152.5 ml); Et$_2$AlCl (C) 15 mmoles; temperature 70° C.; propylene pressure 10 atm.

The propylene (200 ml) was introduced in liquid form between 10° and 20° C. under a pressure of 2-4 atm. in the reactor containing the solvent, the catalyst and the promoter (C). Then, the stirrer was started, the temperature raised to 70° whereby the pressure increased to the above-mentioned value. After 1 hour, the polymerization was stopped and the solid polypropylene formed was isolated by filtration. The yield was 39.6 g which gave an activity of 330. The present crystallinity of the obtained product was calculated to be 25% from X-ray diffraction data according to Kunststoffe 51, 69 (1961). The data were obtained by means of a PHILLIPS diffractometer with graphite monochromator and proportional counter; Cu-K α radiations; 30 mA; 40 kV; sweep: ¼°/min.; sweep period 5 min.

EXAMPLES 4 to 26

The procedures outlined in the previous Examples were repeated using a variety of compounds of elements taken from groups Ia, Ib, IIa, IIb, IIIa, IIIb, VIa and VIIb as compounds (A) and derivatives of elements of groups IVa, IVb and Vb as (B) and using $Et_2AlCl$ as promoter (C) under conditions reported in annexed Tables 1a, 2, 3a and 3b Polymerization results from catalysts reported under Examples 17 and 18 were comparable to those obtained in Example 1.

TABLE 1

Preparation of catalysts (modification and activation) and polymerization of ethylene (& propylene)

| | Example No. | | | | |
|---|---|---|---|---|---|
| | 4 | 5 | 6 | 7 | 8 |
| Preparation of catalyst (AB) | | | | | |
| Element (A) | $AcOLi \cdot H_2O$ | $AcOK \cdot H_2O$ | $MgAc_2CH_2$ | $Mg(OH)_2$ | $(AcO)_2Ca \cdot H_2O$ |
| mmoles of (A) | 10 | 20 | 10 | 30 | 20 |
| ml of AcOH | 60 | 100 | 50 | 50 | 80 |
| ml of $Ac_2O$ | 60 | 100 | 50 | 50 | 80 |
| Step (1) temp. (°C.) | 80 | 80 | 75 | 80 | 80 |
| Step (1) time (hrs) | 20 | 20 | 20 | 20 | 20 |
| Step (1) dry time (hrs) | 130 | 100 | 120 | 80 | 80 |
| Step (2) kmd, ml of (B) | $TiCl_4,2$ | $TiCl_4,2$ | $TiCl_4,10$ | $TiCl_4,3$ | $TiCl_4,3$ |
| Step (2) temp. (°C.) | 85 | 80 | 80 | 90 | 100 |
| Step (2) time (hrs) | 1 | 1 | 24 | 2 | 5 |
| (AB) sol. analysis | | | | | |
| (A) metal content (mg/l) | 45 | 1.7 | 130 | 2075 | 205 |
| (B) metal content (mg/l) | 306 | 50 | 2910 | 171 | 1540 |
| Polymerization | | | | | |
| Ethylene (propylene) | | | | | |
| ml of Bz | 250 (200) | 300 (200) | 300 (200) | 200 (300) | 300 (200) |
| amount of catalyst in mg of (B) metal | 2 | 10 (100) | 012 (120) | 2 (1) | 0.2 (260) |
| mmoles of (C) | 8 | 8 (8) | 8 (15) | 10 (8) | 8 (20) |
| temp. (°C.) | 25–70 | 25–40 (70) | 20 (70) | 20–30 (70) | 20 (70) |
| pressure (atm) | 10 | 10 (10) | 10 (10) | 10 (10) | 10 (10) |
| time (hrs) | 6 | 20 (10) | 10 (1) | 1 (2) | 1 (1) |
| weight of polymer (g) | 1.2 | 2.9 (3.3) | .6 (66.2) | 30.6 (71.5) | 30.6 (21) |
| % crystallinity | — | — (—) | — (17) | 70 (12) | 72.5 (—) |
| catalyst activity | 100 | 14.5 (3.3) | 5,000 (550) | 15,300 (35.750) | 153,000 (80.8) |

TABLE 2

Preparation of catalysts (modification and activation) and polymerization of ethylene (& propylene)

| | Example No. | | | | | | |
|---|---|---|---|---|---|---|---|
| | 9 | 10 | 11 | 12 | 13 | 14 | 15 |
| Preparation of catalyst (AB) | | | | | | | |
| Element (A) | $Ca(Ac_2CH_2)_2$ | $Ca(OH)_2$ | $(AcO)_2Ba \cdot H_2O$ | $Al(Ac_2CH_2)_3$ | $Tl(AcO)_3 \cdot H_2O$ | $SeCl_4$ | $Cu(Ac_2CH_2)_2$ |
| mmoles of (A) | 30 | 100 | 20 | 10 | 12 | 20 | 20 |
| ml of AcOH | 50 | 70 | 80 | 50 | 100 | 100 | 50 |
| ml of $Ac_2O$ | 50 | 70 | 80 | 50 | 100 | 0 | 50 |
| Step (1) temp. (°C.) | 80 | 80 | 80 | 80 | 80 | 85 | 80 |
| Step (1) time (hrs) | 20 | 20 | 20 | 20 | 48 | 20 | 20 |
| Step (1) dry time (hrs) | 80 | 60 | 90 | 100 | 80 | 100 | 60 |
| Step (2) kmd, ml of (B) | $TiCl_4,3$ | $TiCl_4,2$ | $TiCl_4,3$ | $TiCl_4,10$ | $TiCl_4,3$ | $TiCl_4,1$ | $TiCl_4,3$ |
| Step (2) temp. (°C.) | 90 | 80 | 120 | 80 | 80 | 80 | 90 |
| Step (2) time (hrs) | 60 | 1 | 4 | 20 | 20 | 10 | 1 |
| (AB) sol. analysis | | | | | | | |
| (A) metal content (mg/l) | traces | 125 | 720 | 860 | 50 | 420 | 104 |
| (B) metal content (mg/l) | 38.5 | 300 | 280 | 2330 | 100 | 109 | 548 |
| Polymerization | | | | | | | |
| Ethylene (propylene) | | | | | | | |
| ml of Bz | 100 (400) | 250 (200) | 200 (200) | 200 (200) | (200) | 350 | 200 (200) |
| amount of catalyst in mg of (B) metal | 1 (6) | 7 (60) | 0.2 (2) | .1 (95) | (48) | .1 | 2.6 (1.7) |
| mmoles of (C) | 15 (16) | 10 (8) | 15 (20) | 8 (10) | (8) | 6 | 8 (15) |
| temp. (°C.) | 20 (70) | 25–65 (70) | 20 (70) | 20–30 (70) | (70) | 20–70 | 25 (70) |
| pressure (atm) | 10 (10) | 2–6 (8) | 10 (10) | 8–10 (10) | (10) | 6–10 | 9–10 (10) |
| time (hrs) | 2 (20) | 1 (20) | 1 (20) | 1 (1) | (20) | 20 | ¼ (5) |
| weight of polymer (g) | 16.8 (1.3) | 62.5 (19.5) | 12.6 (1.5) | 32.5 (21.9) | (2.4) | .2 | 39.5 (4.5) |
| % crystallinity | — (—) | — (—) | — (—) | — (—) | (—) | — | — (—) |
| catalyst activity | 8,400 (10.8) | 9,100 (16.25) | 63,000 (37.5) | 325,000 (230) | (2.5) | 100 | 60,800 (529) |

TABLE 3a

Preparation of catalysts (modification and activation) and polymerization of ethylene (& propylene)

| | \multicolumn{6}{c}{Example No.} | | | | | |
|---|---|---|---|---|---|---|
| | 16 | 17 | 18 | 19 | 20 | 21 |
| Preparation of catalyst (AB) | | | | | | |
| Element (A) | $Mn(Ac_2CH_2)_2 \cdot H_2O$ | $Mg(OAc)_2 \cdot H_2O$ | $Mg(OAc)_2 \cdot H_2O$ | $Mg(OAc)_2 \cdot H_2O$ | $Mg(Ac_2CH_2)_2$ | $Al(OH)_3$ |
| mmoles of (A) | 20 | 25 | 10 | 10 | 20 | 15 |
| ml of AcOH | 50 | 70 | 70 | 70 | 100 | 35 |
| ml of $Ac_2O$ | 50 | 70 | 70 | 70 | 100 | 35 |
| Step (1) temp. (°C.) | 80 | 85 | 80 | 80 | 80 | 80° |
| Step (1) time (hrs) | 20 | 20 | 20 | 20 | 48 | 24 |
| Step (1) dry time (hrs) | 60 | 140 | 140 | 120 | 80 | 30 |
| Step (2) kmd, ml of (B) | $TiCl_4$, 2 | $GeCl_4$, 1 | $SnCl_4$, 5 | $VOCl_4$, 5 | $VCl_4$, 2 | — |
| Step (2) temp. (°C.) | 90 | 80 | 85 | 80 | 80 | — |
| Step (2) time (hrs) | 1 | 1 | 1 | 1 | 2 | — |
| (AB) sol. analysis | | | | | | |
| (A) metal content (mg/l) | 745 | 1.7 | 400 | 400 | 500 | 600 |
| (B) metal content (mg/l) | 4207 | 100 | 100 | 60 | 525 | — |
| Polymerization Ethylene (propylene) | | | | | | |
| ml of Bz | 300 (200) | | | 300 | 300 (400) | |
| amount of catalyst in mg of (B) metal | 4.2 (60) | | | 4 | 25 (58) | |
| mmoles of (C) | 8 (15) | | | 8 | 15 (30) | |
| temp. (°C.) | 20–38 (70) | | | 25–40 | 20–40 (70) | |
| pressure (atm) | 8–10 (4–8) | | | 10 | 10 (0) | 10 |
| time (hrs) | ¼ (3) | | | 2 | 2 (10) | |
| weight of polymer (g) | 74 (52.1) | | | 5.1 | 8.2 (31) | |
| % crystallinity | — (—) | | | — | 13 (—) | — |
| catalyst activity | 70,480 (289) | | | 637 | 164 (53.5) | 15 |

TABLE 3b

Preparation of catalysts (modification and activation) and polymerization of ethylene (& propylene)

| | \multicolumn{5}{c}{Example No.} | | | | |
|---|---|---|---|---|---|
| | 22 | 23 | 24 | 25 | 26 |
| Preparation of catalyst (AB) | | | | | |
| Element (A) | $Al(OH)_3$ | $La(AcO)_3$ | $Cd(OAc)_2$ | $Zn(Ac_2CH_2)_2$ | $Mg(OAc)_2 \cdot H_2O$ |
| mmoles of (A) | 15 | 10 | 10 | 10 | 10 |
| ml of AcOH | 35 | 50 | 60 | 50 | 50 |
| ml of $Ac_2O$ | 35 | 50 | 60 | 50 | 50 |
| Step (1) temp. (°C.) | 80° | 90 | 85 | 80° | 80 |
| Step (1) time (hrs) | 24 | 20 | 22 | 20 | 20 |
| Step (1) dry time (hrs) | 30 | 24 | 48 | 48 | 4 |
| Step (2) kmd, ml of (B) | $TiCl_4$, 3 | $TiCl_4$, 2 | $TiCl_4$, 1 | $TiCl_4$, 1 | *$TiCl_3$, 250 mg heptane |
| Step (2) temp. (°C.) | 80 | 80 | 80 | 80 | 80 |
| Step (2) time (hrs) | 40 | 1 | 1 | 1 | 1 |
| (AB) sol. analysis | | | | | |
| (A) metal content (mg/l) | 600 | 21 | 100 | 100 | 85 |
| (B) metal content (mg/l) | 480 | 100 | 590 | 70 | 1240 |
| Polymerization Ethylene (propylene) | | | | | |
| ml of Bz | | 200 | 300 | 300 | (450 heptane) |
| amount of catalyst in mg of (B) metal | | 1 | 14 | 10 | (50) |
| mmoles of (C) | | 15 | 8 | 15 | (6.2) |
| temp. (°C.) | | 20 | 25 | 25 | (70) |
| pressure (atm) | 10 | 10 | 10 | 10 | (6) |
| time (hrs) | | 1 | 1 | 1 | (2) (+0.2$H_2$) |
| weight of polymer (g) | | 21.5 | 23.5 | 20.5 | (35.5) |
| % crystallinity | — | — | — | — | (90) |
| catalyst activity | 2,510 | 21,500 | 1,680 | 2,050 | (718) |

*$TiCl_3$ from Stauffer Chemical, West Port, Conn. 06880 U.S.A.

I claim:

1. A process for the polymerization of propylene comprising the following steps:
(1) heating, while mixing and milling, for 10–30 hours at 70°–100° C. in the absence of air and moisture, at least one supporting compound selected from the group consisting of aluminum acetate, aluminum hydroxide and aluminum acetylacetonate with a mixture of acetic acid and acetic anhydride to obtain a solid product and then eliminating under heat and reduced pressure the volatile portions of the solid product;
(2) forming a homogeneous solution or dispersion of said solid product in a non-polar dry hydrocarbon solvent and adding thereto, while mixing, $TiCl_3$ for activation and heating the mixture to obtain a homogeneous solution or dispersion of an activated catalyst;

(3) polymerizing propylene by admixing the activated catalyst, the propylene and a metal-organic compound of formula $Al_nR_yX_{(3n-y)}$ wherein R is an alkyl group, X is a halogen, n is 1 or 2, y is an integer not exceeding 3 when n=1 and equal to 1, 3 or 5 when n=2, in a non-polar hydrocarbon at 20°–70° C. under a pressure of 2–50 atmospheres.

2. A process according to claim 1, wherein the non-polar dry hydrocarbon solvent is benzene.

3. A process for the polymerization of propylene comprising the following steps:
(1) heating, while mixing and milling, for 10–30 hours at 70°–100° C. in the absence of air and moisture, magnesium acetate with a mixture of acetic acid and acetic anhydride to obtain a solid product and then eliminating under heat and reduced pressure the volatile portions of the solid product;
(2) forming a homogeneous solution or dispersion of said solid product in a non-polar dry hydrocarbon solvent and adding thereto, while mixing, $TiCl_3$ for activation and heating the mixture to obtain a homogeneous solution or dispersion of an activated catalyst;
(3) polymerizing propylene by admixing the activated catalyst, the propylene and a metal-organic compound of formula $Al_nR_yX_{(3n-y)}$ wherein R is an alkyl group, X is a halogen, n is 1 or 2, y is an integer not exceeding 3 when n=1 and equal to 1, 3 or 5 when n=2, in a non-polar hydrocarbon at 20°–70° C. under a pressure of 2–50 atmospheres.

4. A process according to claim 3 wherein the non-polar dry hydrocarbon solvent is benzene.

* * * * *